United States Patent
Taubert et al.

(10) Patent No.: US 10,797,794 B2
(45) Date of Patent: Oct. 6, 2020

(54) TWO-WAY DATA COMMUNICATION SYSTEM FOR AIRCRAFT CABINS

(71) Applicant: Lufthansa Technik AG, Hamburg (DE)

(72) Inventors: Sven Taubert, Hamburg (DE); Christopher Petermann, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 16/349,629

(22) PCT Filed: Nov. 21, 2017

(86) PCT No.: PCT/EP2017/079845
§ 371 (c)(1),
(2) Date: May 14, 2019

(87) PCT Pub. No.: WO2018/091719
PCT Pub. Date: May 24, 2018

(65) Prior Publication Data
US 2019/0349082 A1    Nov. 14, 2019

(30) Foreign Application Priority Data
Nov. 21, 2016   (DE) .................. 10 2016 222 933

(51) Int. Cl.
*H04B 10/00* (2013.01)
*H04B 10/116* (2013.01)
(Continued)

(52) U.S. Cl.
CPC ........ *H04B 10/116* (2013.01); *B64D 11/0015* (2013.01); *H04B 10/1143* (2013.01); *B64D 2011/0038* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| 6,614,126 B1 | 9/2003 | Mitchell |
| 2004/0077308 A1 | 4/2004 | Sanford et al. |

(Continued)

FOREIGN PATENT DOCUMENTS

| DE | 102005016522 A1 | 10/2006 |
| DE | 102008024217 A1 | 12/2009 |

(Continued)

*Primary Examiner* — Daniel G Dobson
(74) *Attorney, Agent, or Firm* — Leydig, Voit & Mayer Ltd.

(57) ABSTRACT

A data communication system has: a cabin module with a transmission and reception unit; and a furniture module, which is fastened in a furniture item anchored in a cabin, and has a transmission and reception unit. The transmission and reception units each have a controllable light source and a light sensor. The furniture module is disposed relative to the cabin module such that light emanating from the light source of the transmission and reception unit of the cabin module is detectable by the light sensor of the transmission and reception unit of the furniture module and light emanating from the light source of the transmission and reception unit of the furniture module is detectable by the light sensor of the transmission and reception unit the one cabin module.

14 Claims, 2 Drawing Sheets

(51) Int. Cl.
    *B64D 11/00* (2006.01)
    *H04B 10/114* (2013.01)
    *H04J 14/00* (2006.01)

(58) Field of Classification Search
    CPC ............ H04B 10/1127; H04B 10/1129; H04B
        10/114; H04B 10/1141; H04B 10/1143;
        H04B 10/1149; H04B 10/116; H04B
        10/118
    See application file for complete search history.

(56) References Cited

U.S. PATENT DOCUMENTS

| | | |
|---|---|---|
| 2007/0065148 A1 | 3/2007 | Behr et al. |
| 2008/0219671 A1 | 9/2008 | Schmitt |
| 2009/0295223 A1 | 12/2009 | Bauer et al. |
| 2011/0069957 A1 | 3/2011 | Kim et al. |
| 2011/0069958 A1 | 3/2011 | Haas et al. |
| 2011/0148664 A1 | 6/2011 | Shiomori et al. |
| 2012/0275795 A1* | 11/2012 | Chan ................... H04B 10/116 398/128 |

FOREIGN PATENT DOCUMENTS

| | | |
|---|---|---|
| EP | 2393225 A1 | 12/2011 |
| EP | 2487109 A1 | 8/2012 |
| WO | WO 2006032221 A1 | 3/2006 |

* cited by examiner

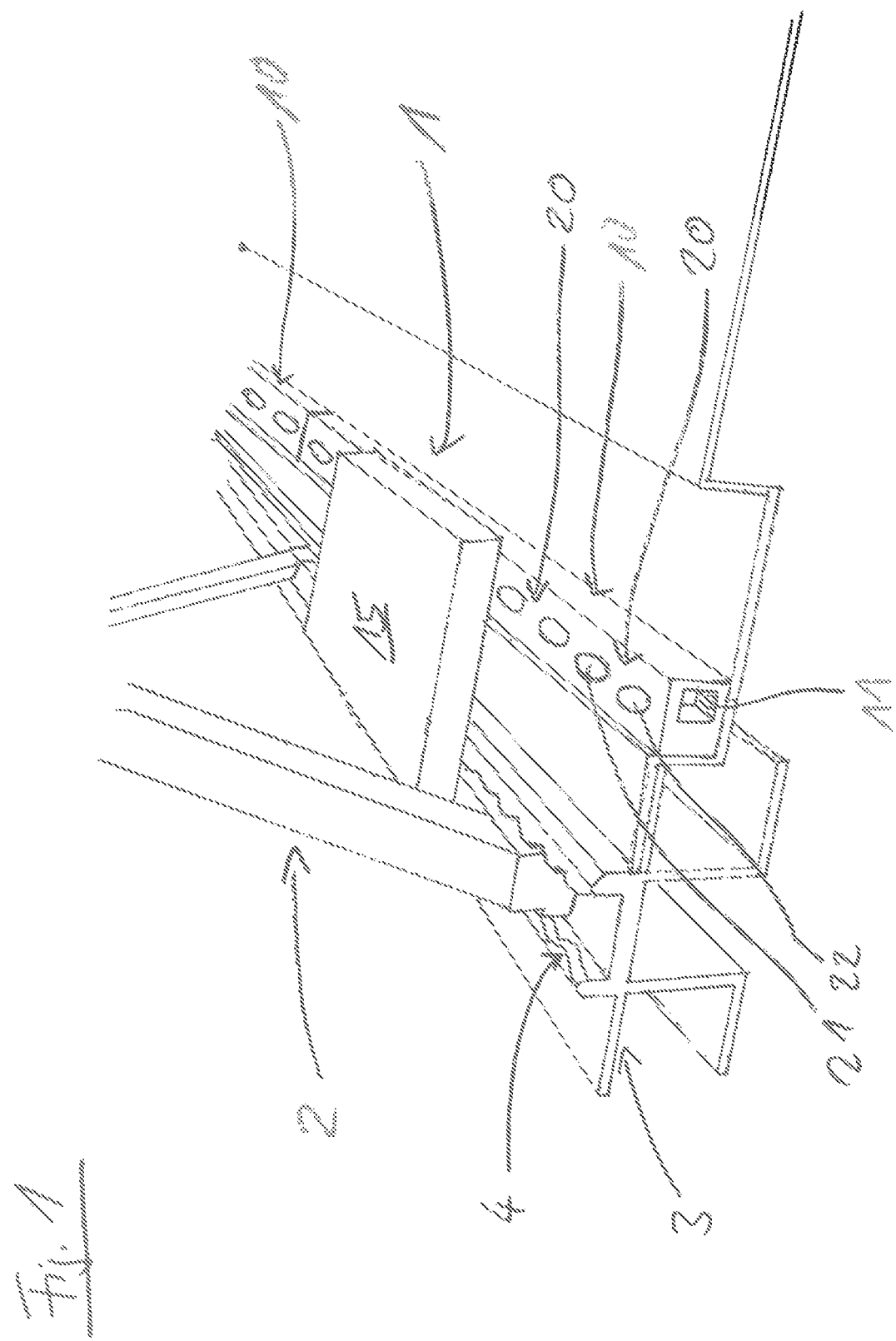

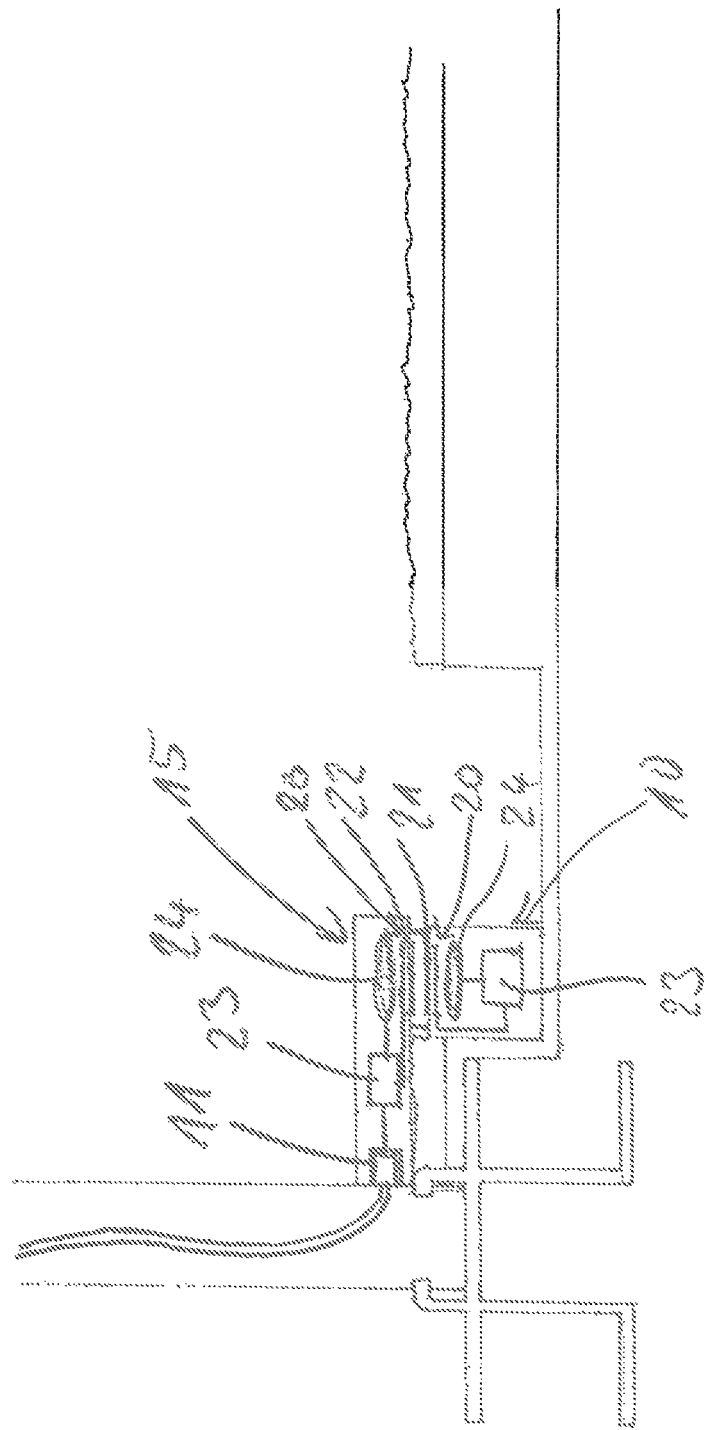

TWO-WAY DATA COMMUNICATION SYSTEM FOR AIRCRAFT CABINS

CROSS-REFERENCE TO PRIOR APPLICATIONS

This application is a U.S. National Stage Application under 35 U.S.C. § 371 of International Application No. PCT/EP2017/079845 filed on Nov. 21, 2017, and claims benefit to German Patent Application No. DE 10 2016 222 933.8 filed on Nov. 21, 2016. The International Application was published in German on May 24, 2018, as WO 2018/091719 A2 under PCT Article 21(2).

FIELD

The invention relates to a two-way data communication system for aircraft cabins and a method for the initialization thereof.

BACKGROUND

In modern commercial aircraft, in particular long-haul aircraft, a so-called "personal television" is often offered as in-flight entertainment. With this system each seat place has an individual monitor and associated headphone port, on which an aircraft passenger can call up audio or video-on-demand content at any point in time as desired. (Computer) games or live television channels can also be provided.

For individually supplying the individual monitors with content, a powerful communications network is used between the monitors and an on-board server that provides the content.

The monitors can be connected to the on-board server via data cables for this. For this purpose, openings are provided as cable feedthroughs in the floor of the aircraft cabin, through which cables are fed from the monitors to the server, possibly via network switches. In principle, corresponding cable connections offer an adequate bandwidth for "personal television". However, it is a disadvantage of said approach that in the event of a reconfiguration of the aircraft cabin, for example by varying the distance between rows of seats, new cable feedthroughs and/or a complete rewiring are/is often required. The flexibility of the configuration of the aircraft cabin is thus severely limited.

In order to improve the flexibility of reconfiguration of the aircraft cabin, DE 10 2008 024 217 A1 proposes a system for contactless data and power transmission, with which both power and data can be transmitted wirelessly by means of an inductive coupling between a first coil recessed in the floor of the aircraft cabin and a second coil disposed on an aircraft seat. If a number of coils are provided on the floor of the aircraft cabin, an aircraft seat can be variably disposed at those positions in the aircraft cabin at which the coil of the aircraft seat is close enough to couple to a first coil on the floor of the cabin. It is a disadvantage of this system that the comparatively small bandwidth is regularly insufficient for data transmissions for "personal television". Moreover, with inductive data transmission there are regularly electromagnetic noise emissions.

For example, it is further known from EP 2 393 225 A1 for the data transmission from the on-board server to the individual monitors to modulate the cabin lighting invisibly to the human eye so that data can be transmitted by the cabin lighting in the ceiling of the aircraft cabin to suitable sensors connected to the monitors. However, in this case the return of signals from the monitor to the on-board server continues to be carried out by wire, so that the aforementioned disadvantages of cable connections continue to exist with this technology.

SUMMARY

An embodiment of the present invention provides a two-way data communication system for an aircraft cabin that includes: at least one cabin module disposed in the aircraft cabin with at least one transmission and reception unit; and a furniture module fastened in a furniture item anchored in the aircraft cabin with a transmission and reception unit. The transmission and reception unit of each of the cabin module and the furniture module each have a controllable light source and a light sensor. The furniture module is disposed relative to the cabin module such that light emanating from the light source of one of the at least one transmission and reception unit of the at least one cabin module is detectable by the light sensor of the transmission and reception unit of the furniture module and light emanating from the light source of the transmission and reception unit of the furniture module is detectable by the light sensor of the corresponding transmission and reception unit of the at least one cabin module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a schematic representation of a preferred exemplary embodiment of a two-way data communication system according to the invention; and FIG. 2 shows a schematic sectional view of FIG. 1.

DETAILED DESCRIPTION

Embodiments of the present invention provide a two-way data communication system for aircraft cabins, with which the disadvantages of the state of the art no longer occur or only continue to occur to a reduced extent.

Embodiments of the present invention provide a two-way data communication system for aircraft cabins having at least one cabin module disposed in the aircraft cabin with at least one transmission and reception unit and a furniture module fastened in a furniture item anchored in the aircraft cabin with a transmission and reception unit. The transmission and reception units each include a controllable light source and a light sensor and the furniture module is disposed relative to the cabin module so that light emanating from the light source of one of the transmission and reception units of the at least one cabin module is detected by the light sensor of the transmission and reception unit of the furniture module and light emanating from the light source of the transmission and reception unit of the furniture module is detected by the light sensor of the same transmission and reception unit of the at least one cabin module.

Embodiments of the present invention further provide a method for the initialization of a two-way data communication system according to the invention, with the steps:

sending an initialization request by all transmission and reception units of all cabin modules;

sending an initialization response by the transmission and reception units of those furniture modules that have received an initialization request; and creating or checking the furniture configuration in the aircraft cabin using the detection of those cabin modules that receive an initialization response from a furniture module.

The data communication system according to the present invention is based on so-called (visual) light communications, with which the data are transmitted by (visible) light at least in part of a data transmission path. In this case, only a line of sight between the transmitter and the receiver is necessary for the light transmission path. A physical connection, such as for example cables for data transmission by current pulses, is not necessary. Consequently, with the solution according to embodiments of the present invention furniture items can be mounted at any point of an aircraft cabin at which data transmission between the associated furniture module and a cabin module is possible. In particular, if more cabin modules than furniture items with a furniture module are provided in an aircraft cabin, there is already flexibility in the arrangement of the furniture items. Re-laying cables is not necessary in this case.

Moreover, the data communication system offers a high transmission rate and at the same time extremely advantageous electromagnetic compatibility. Unlike with data transmission by inductive coupling, no interfering and in particular fluctuating electromagnetic field is produced that could interfere with other electronic equipment and devices.

Moreover, owing to the direct connection between a furniture module and a cabin module, each including a transmission and reception unit, two-way communications are possible. In particular, a cable return channel can be omitted.

With the arrangement of the furniture module relative to the cabin module, the distance between the furniture item module and the cabin module can for example be less than 1 inch (2.54 cm), preferably 0.1 cm to 1 cm.

The transmission and reception units of both the furniture module and the cabin module can be implemented identically to each other. To convert received light pulses into electrical signals or to produce light pulses based on electrical signals, the furniture item module and the cabin module can include a control unit designed for this purpose. It is possible that a plurality of transmission and reception units are controlled by one control unit. The control unit can be embodied for modulation of the data to be transmitted. In this case, any digital modulation method can be resorted to, such as binary phase keying (BPSK), quadrature phase keying (QPSK) or quadrature amplitude modulation (QAM).

The optical data transmission can be carried out in the infrared range (wavelengths of approx. 780 nm to 1 mm), in the visible range (wavelengths of approx. 380 nm to 780 nm) or in the ultraviolet range (wavelength of approx. 1 nm to 380 nm).

The furniture item is an aircraft seat as a rule. Therefore, the terms "furniture item" and "aircraft seat" or "seat" are used practically synonymously below, even though the invention is not directly limited to aircraft seats.

Pieces of furniture for aircraft cabins or aircraft seats are regularly, and also in the context of this invention, preferably anchored in fastening rails or seat rails extending along on the floor of the aircraft cabin. In particular, fastening rails provided for aircraft seats often extend through the entire aircraft cabin in the longitudinal direction of the aircraft. In order to make the arrangement of the individual seats or rows of seats flexible, the fastening rails often include a structural pattern that provides almost any position of individual seats or rows of seats along the fastening rails. In particular, this also allows the distance between two rows of seats to be fixed. The dimension of the structural pattern—i.e. the distance between two locking positions—is 1 inch (2.54 cm) as a rule.

It is preferable if at least one of the cabin modules is made elongated and includes a plurality of transmission and reception units disposed lengthwise, preferably at equal intervals. As a result, it is possible that a furniture item with the furniture module can be disposed in at least two different positions relative to the cabin module, where the transmission and reception unit of the furniture module can then communicate with one of the transmission and reception units on the cabin module. It is moreover possible that two or more furniture items, each with a furniture module, are connected to a cabin module by the transmission and reception unit of the furniture module of each furniture item communicating with a respective transmission and reception unit of the cabin module.

The longitudinal axis of the cabin module is more preferably oriented parallel to a fastening rail disposed on the floor of the aircraft cabin, where the distance between the transmission and reception units of the cabin module can correspond to the structural pattern of the fastening rails. If the floor rail is designed suitably, the furniture items and in particular aircraft seats can be positioned in or displaced into any position along the fastening rails in the vicinity of the cabin module. This ensures that a suitable transmission and reception unit of the cabin module for communications with the transmission and reception unit of the furniture module is disposed at the position.

It is preferable if at least two cabin modules are provided, where the cabin modules are preferably disposed parallel to a fastening rail on the floor of the aircraft cabin. In particular, the cabin modules can be disposed immediately one after the other in this case. By a corresponding arrangement of a plurality of cabin modules it is possible to provide transmission and reception modules on the floor over the entire length of a fastening rail, for example throughout the entire aircraft cabin, so that furniture items or aircraft seats can be anchored to the fastening rails in any position, where two-way data communications by means of the respective associated furniture modules are then ensured. At the same time, the length of the individual cabin modules can be limited so that the replacement of individual defective cabin modules without problems is possible, for example.

The cabin module may include a coupling device for exchanging data with a further cabin module. A coupling device is preferably disposed on an end face of the cabin module in this case. Owing to a corresponding coupling device, a series circuit of at least two cabin modules, which are mutually adjacent at the end faces thereof, can be implemented in a simple way. Electrical energy can also preferably be transmitted by means of the coupling device. As a result, it is achieved that only a first cabin module of a series circuit has to be connected to an on-board data network or server and/or a power supply; the remaining cabin modules of the series circuit can then be provided with data and/or energy through the first cabin module. The coupling device can also include a transmission and reception unit with a controllable light source and a light sensor similarly to the transmission and reception units that are provided for communications between the cabin module and the furniture module.

It is preferable if the furniture module and/or at least one cabin module includes a standardized data transmission interface for connection to further devices, where the data transmission interface is preferably also embodied for supplying power, for example according to the power-over-Ethernet principle. By means of corresponding standardized data transmission interfaces, such as for example RJ-45 plugs and sockets, it is possible to connect a furniture module or a cabin module to a monitor, a data communications network and/or a server that regularly include standardized data transmission interfaces. In particular, a for example cable-based infrastructure for the in-flight entertainment system that already exists on board an aircraft can be simply and inexpensively converted for two-way data communications according to the invention. Already existing furniture items or aircraft seats can also be simply converted to furniture items according to the invention.

In addition to the optical data transmission, furniture modules and cabin modules can include means for wireless, preferably inductive power transmission from the cabin module to the furniture module. As a result, the furniture modules and any equipment connected thereto, such as for example monitors, can be supplied with energy wirelessly by means of the cabin module. As a result, with such an embodiment a cable connection between the furniture item and the aircraft is not necessary. Because the wireless, in particular inductive, power supply does not have to be modulated for data transmission, unlike in the prior art, more favorable electromagnetic compatibility can be achieved. This particularly applies to the case of inductive power transmission, with which the frequency of the inductive coupling can be selected to cause very little interference.

It is preferable if a sealing arrangement is provided on the furniture module, preferably a peripheral rubber lip, to form a closed space around the intercommunicating transmission and reception units on the furniture item modules and cabin modules. Owing to a corresponding sealing arrangement, it can be ensured that following assembly of the furniture item with the furniture module no foreign bodies or liquids that could interfere with the communications can pass into the line of sight between the two transmission and reception units. The entry of light from external light sources that could interfere with the communications is also prevented.

At least one cover element is preferably provided for covering at least one transmission and reception unit on the cabin module that is not used for communications with a furniture module. Unused transmission and reception units can be protected against damage with a suitable cover element. In particular, if the cabin module is disposed on the floor of the aircraft cabin, the cover element can include a surface matching the other floor covering in the aircraft cabin. The surface can be matched by color design on the other floor covering, for example by printing. In particular however, the cover element can be provided with the other floor covering itself, for example carpet, such that the floor covering disposed on the cover element blends in with the other floor covering. For the light sources and light sensors of the transmission and reception units, cutouts in the floor covering can be provided. Alternatively or additionally, it is also possible that the cover element is sufficiently transparent, at least in the wavelength ranges used for communications by the transmission and reception units, that the communications can be carried out through the cover element. In this case, it is in principle sufficient if the cover element is only transparent in the region of the light sources and light sensors of the transmission and reception units. It is however also possible that the cover element is designed to be fully suitably transparent. In both cases, the cover element can extend over an entire cabin module. Regardless of this, the cover element can be made in one piece with a cover for the fastening rail.

It is preferable if at least one light source is a LED or an OLED and/or at least one light sensor is a photodiode. Suitable light sources and sensors are seen as reliable and moreover also have a low weight. It is further preferable if the light source and/or the light sensor preferably include(s) an optical conductor, with which the location of the light generation can be spatially separated from the location of the light outlet and/or the location of the light detection can be spatially separated from the location of the light entry. A suitable optical conductor can for example be a glass fiber or a bundle of glass fibers. By using suitable optical conductors, for example the light sources and light sensors of a plurality of transmission and reception units of a cabin module and possibly the coupling device thereof can be combined in the immediate vicinity of control electronics—for example in the form of arrays, where the optical conductors can further be used to ensure that the light is further transmitted and detected at the points provided for this purpose along the cabin module.

The cabin module can be disposed both on a side wall or on the floor of the aircraft cabin. It is also possible that the cabin module is integrated within a side wall or in the floor of the aircraft cabin. The cabin module can be glued on the side wall or on the floor for this purpose. The cabin module can also be fastened in a recess or groove in the floor or in the side wall of the aircraft cabin.

It is also possible that a transmission and reception unit includes a plurality of light sources and/or light sensors or a plurality of transmission and reception units are disposed immediately adjacent to each other in order to provide a plurality of parallel data transmission paths between a furniture module and the cabin module to increase the bandwidth. In order to prevent mutual interference, it can be provided that light sources and/or light sensors of the transmission and reception units of furniture item modules and cabin modules are provided with filters in pairs, so that optical isolation of the light sources and light sensors of parallel data transmission paths can be omitted.

With the method according to the invention for initialization of a two-way data communication system according to the invention, first all transmission and reception units of the cabin modules are activated and issue an initialization request. In particular, the initialization request is thus issued by all transmission and reception units of the cabin modules without specific knowledge of which transmission and reception unit of the cabin modules is actually associated with the transmission and reception unit of a furniture module. Only in a second step, in which the transmission and reception units of the furniture modules return an initialization response provoked by the initialization request, which is received by the respective associated transmission and reception units of the cabin modules, is it determined which transmission and reception unit of the cabin module is actually associated with a transmission and reception unit of a furniture module.

Because the position of the transmission and reception unit of the cabin modules is known in principle, a furniture item or seat configuration or an aircraft cabin is determined or checked using the determination of those cabin modules receiving an initialization response from a furniture module. If no furniture item configuration or seat configuration is known at first, initial information results from the position in the cabin of the transmission and reception unit in question of the cabin modules at which furniture items or seats including a furniture module are disposed. If a furniture item configuration or a seat configuration is known (for example by a determination as described above), any malfunctions in the data transmission can be determined using the position of the transmission and reception unit in question of the cabin modules.

The transmission and reception units of the cabin modules at which no initialization response is received are preferably switched off, inter alia to save energy.

The initialization of the two-way data communication system according to the invention may include a bandwidth test. For this a certain amount of data is transmitted by means of the individual transmission and reception units and is checked for the time necessary for error-free transmission. This also allows any malfunctions to be uncovered.

The invention is now described using an advantageous embodiment with reference to the accompanying drawings by way of example.

FIG. 1 shows a schematic representation of a two-way data communication system 1 according to the invention, whereas in FIG. 2 an associated schematic sectional view is shown.

The illustrated two-way data communication system 1 is embodied for communications between an in-flight entertainment server (not shown) and in-flight entertainment-monitors with touch sensitive screens (not shown), each of which is integrated in an aircraft seat 2. The aircraft seat 2 indicated in FIG. 1 is anchored in a fastening rail 3 extending on the floor of the aircraft cabin. The fastening rail 3 includes a structural pattern 4 in this case, so that in principle the aircraft seat 2 can be fastened to the fastening rail 3 in any position along the fastening rail 3.

A plurality of oblong cabin modules 10, 10' are disposed parallel to the fastening rail 3, each implemented with an identical design. A cabin module 10, 10' includes a number of transmission and reception units 20, each including a LED as the light source 21 and a photodiode as the light sensor 22.

An RJ-45 socket on the cabin module 10 acts as a data transmission interface 11 for connecting to an onboard Ethernet and thereby indirectly to the in-flight entertainment-server. Moreover, the first cabin module 10 is supplied with the electrical power necessary for operation by means of the data transmission interface 11. On the other side that is not shown of the first cabin module 10, an RJ-45 plug is provided that is connected to a corresponding socket on the second cabin module 10'. The cabin modules 10, 10' are connected in series in this way, where only the first cabin module 10 has to be connected to the on-board network; the second and all further cabin modules 10' are then supplied with power and data via the first cabin module 10. The RJ-45 socket and the RJ-45 plug for connecting two cabin modules 10, 10' are thus a coupling device for exchanging data, but also for transmitting power between the cabin modules 10, 10'.

A furniture module 15 is fastened to the furniture item or aircraft seat 2. The furniture module 15 also includes a transmission and reception unit 20, which however is disposed on the side facing towards the cabin module 10, which is why it is not to be seen in FIG. 1. In this case, the transmission and reception unit 20 of the furniture module 15 is embodied identically to the transmission and reception units 20 of the cabin modules 10, 10'.

In principle, the transmission and reception unit 20 of the furniture module 15 is fastened to the aircraft seat 2 such that the light sources 21 and light sensors 22 of the transmission and reception unit 20 of the furniture module 15 and a transmission and reception unit 20 of the cabin module 10 are disposed directly opposite each other independently of the anchoring position of the aircraft seat 2 in the fastening rail 3. This ensures that light emanating from the light source 21 of one of the transmission and reception units 20 of a cabin module 10, 10' can be detected by the light sensor 22 of the transmission and reception unit 20 of the furniture module 15 and light emanating from the light source 21 of the transmission and reception unit 20 of the furniture module 15 can be detected by the light sensor 22 of the same transmission and reception unit 20 of the cabin module 10, 10'. As a result, two-way communications are enabled, for example between a monitor disposed on the aircraft seat 2 and the in-flight entertainment server.

A schematic sectional view through the two-way data communication system 1 according to FIG. 1 is shown in FIG. 2. In particular, the directly opposing arrangement of the light source 21 of a transmission and reception unit 20 of the cabin module 10 and the light sensor 22 of the transmission and reception unit 20 of the furniture module 15 can be seen in FIG. 2. There is also a corresponding arrangement for the light source 21 of the transmission and reception unit 20 of the furniture module 15 and the light sensor 22 of the transmission and reception unit 20 of the cabin module 10.

The transmission and reception units 20, both in the cabin module 10 and in the furniture module 15, are each connected to a control unit 23 that actuates the respective light sources 21 according to received electrical signals and converts light pulses received by means of the light sensors 22 into electrical signals.

Moreover, the control units 23 are each connected to coils 24 for inductive power transmission. In this case, the control unit 23 of the cabin module 10 produces an electrical alternating field in the associated coil 24 that causes a counter induction in the coil 24 of the furniture module 15, which is used by the control unit 23 as electrical energy but can also be passed on.

A data transmission interface 11, to which the monitor (not shown) is connected, is provided on the furniture module 15. Moreover, the monitor is supplied with electrical power via the data transmission interface 11, namely with electrical power received by the coil 24 of the furniture module 15. A cable connection for supplying power between the aircraft seat 2 and the floor of the cabin can therefore be completely omitted.

Furthermore, the furniture module 15 includes on the underside thereof a sealing arrangement 16 designed as a peripheral rubber lip, with which the region between the intercommunicating transmission and reception units 20 of the furniture item module 15 and the cabin module 10 is screened from the surroundings. Owing to the sealing arrangement 16 no interfering ambient light passes to the light sensors 22 of the transmission and reception units 20 and there is no risk that foreign bodies could interfere with communications.

For the transmission and reception units 20 of the cabin modules 10, 10' (cf. FIG. 1) that are not used in a certain cabin configuration, cover elements (not shown) can be provided, with which the transmission and reception units 20 are protected against damage and which can include an upper side matching the remaining floor covering of the aircraft cabin, for example carpet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A two-way data communication system for an aircraft cabin comprising:
    at least one cabin module disposed in the aircraft cabin with at least one transmission and reception unit; and
    a furniture module fastened in a furniture item anchored in the aircraft cabin with a transmission and reception unit,
    wherein the transmission and reception unit of each of the cabin module and the furniture module each comprise a controllable light source and a light sensor, and
    wherein the furniture module is disposed relative to the cabin module such that light emanating from the light source of one of the at least one transmission and reception unit of the at least one cabin module is detectable by the light sensor of the transmission and reception unit of the furniture module and light emanating from the light source of the transmission and reception unit of the furniture module is detectable by the light sensor of the corresponding transmission and reception unit of the at least one cabin module,
    wherein the cabin module or the furniture item are fastened to the floor of the aircraft cabin.

2. The two-way data communication system as claimed in claim 1,
    wherein the cabin module is oblong and comprises a plurality of transmission and reception units, of the at least one transmission and reception unit of the at least one cabin module, disposed lengthwise, and
    wherein a longitudinal axis of the cabin module is oriented parallel to a fastening rail disposed on the floor of the aircraft cabin and/or the distance between the transmission and reception units of the cabin module corresponds to a structural pattern of the fastening rail.

3. The two-way data communication system as claimed in claim 1, wherein the at least one cabin module comprises at least two cabin modules, wherein the two cabin modules are disposed parallel to a fastening rail disposed on the floor of the aircraft cabin.

4. The two-way data communication system as claimed in claim 1, wherein the cabin module comprises at least one coupling device for exchanging data with a further cabin module.

5. The two-way data communication system as claimed in claim 4, wherein the coupling device comprises another transmission and reception unit with a controllable light source and a light sensor.

6. The two-way data communication system as claimed in claim 1, wherein the furniture module and/or the at least one cabin module comprise(s) a data transmission interface for connection to further devices.

7. The two-way data communication system as claimed in claim 1, wherein the furniture module and the cabin module are configured for for wireless power transmission from the cabin module to the furniture module.

8. The two-way data communication system as claimed in claim 1, wherein a sealing arrangement is on the furniture module for forming a closed space about the transmission and reception unit on each of the furniture module and the cabin module.

9. The two-way data communication system as claimed in claim 1, wherein at least one cover element is provided for covering at least one transmission and reception unit on the cabin module that is not used for communications with the furniture module.

10. The two-way data communication system as claimed in claim 1, wherein at least one of the light source of the furniture module or the cabin module is a LED or an OLED and/or at least one of the light sensor of the furniture module of the cabin module is a photodiode.

11. A method for the initialization of a two-way data communication system for an aircraft cabin, the two-way data communication system comprising: at least one cabin module disposed in the aircraft cabin with at least one transmission and reception unit and a furniture module fastened in a furniture item anchored in the aircraft cabin with a transmission and reception unit, wherein the transmission and reception unit of each of the cabin module and the furniture module each comprise a controllable light source and a light sensor, and wherein the furniture module is disposed relative to the cabin module such that light emanating from the light source of one of the at least one transmission and reception unit of the at least one cabin module is detectable by the light sensor of the transmission and reception unit of the furniture module and light emanating from the light source of the transmission and reception unit of the furniture module is detectable by the light sensor of the corresponding transmission and reception unit of the at least one cabin module, the two-way data communication system further comprising a plurality of furniture modules, comprising the furniture module, each of the furniture modules having a transmission and reception unit, the method comprising:
    sending an initialization request by the transmission and reception unit of each of the at least one cabin module;
    sending an initialization response by the transmission and reception unit of those of the furniture modules having received the corresponding initialization request; and
    creating or checking a furniture configuration in the aircraft cabin using the detection of those of the at least one cabin module that have received the corresponding initialization response from at least one of the furniture modules.

12. The method as claimed in claim 11, wherein the transmission and reception unit of each of the at least one cabin module that have not received the initialization response are switched off.

13. The method as claimed in claim 11, wherein initialization includes a bandwidth test.

14. The two-way data communication system as claimed in claim 10, wherein the at least one of the light source of the furniture module or the cabin module and/or the at least one of the light sensor of the furniture module or the cabin module comprise(s) an optical conductor, with which a location of light generation can be spatially isolated from a location of light outlet and/or a location of light detection can be spatially isolated from a location of the light entry.

\* \* \* \* \*